(12) United States Patent
Wakabayashi

(10) Patent No.: US 12,709,187 B2
(45) Date of Patent: Aug. 18, 2026

(54) CELL BALANCING METHOD AND CELL BALANCING SYSTEM

(71) Applicant: SUBARU CORPORATION, Tokyo (JP)

(72) Inventor: Kenta Wakabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 570 days.

(21) Appl. No.: 18/344,388

(22) Filed: Jun. 29, 2023

(65) Prior Publication Data

US 2024/0034193 A1 Feb. 1, 2024

(30) Foreign Application Priority Data

Jul. 27, 2022 (JP) ................................ 2022-119849

(51) Int. Cl.

| | |
|---|---|
| ***H02J 7/00*** | (2026.01) |
| ***B60L 58/12*** | (2019.01) |
| ***B60L 58/22*** | (2019.01) |
| ***H02J 7/52*** | (2026.01) |
| ***H02J 7/82*** | (2026.01) |
| ***H02J 7/90*** | (2026.01) |

(52) U.S. Cl.

CPC .............. *B60L 58/22* (2019.02); *B60L 58/12* (2019.02); *H02J 7/52* (2026.01); *H02J 7/82* (2026.01); *H02J 7/933* (2026.01); *H02J 7/977* (2026.01)

(58) Field of Classification Search

USPC ........................................................ 320/109

See application file for complete search history.

(56) References Cited

U.S. PATENT DOCUMENTS

| | | | | |
|---|---|---|---|---|
| 9,548,615 | B2 * | 1/2017 | Takeo .................. | B60W 20/00 |
| 2015/0035495 | A1 * | 2/2015 | Yoshida .............. | H01M 10/425 320/134 |
| 2021/0098997 | A1 * | 4/2021 | Bunnell .................... | H02J 7/52 |

FOREIGN PATENT DOCUMENTS

| | | |
|---|---|---|
| JP | 2015-037011 A | 2/2015 |

* cited by examiner

*Primary Examiner* — Samuel Berhanu
(74) *Attorney, Agent, or Firm* — RIMON P.C.

(57) ABSTRACT

A cell balancing method includes: setting predicted standing time, based on a statistic value of standing time collected over a predetermined period of time; estimating a capacity retention rate of each of cells of a lithium-ion battery at a next start-up after a lapse of the predicted standing time; on the condition that a difference in the estimated capacity retention rate between a maximum value and a minimum value becomes greater than a predetermined value, setting state-of-charge adjustment values for one or both of a cell having the maximum value and a cell having the minimum value; and allowing, during the stoppage of the electric vehicle, a state-of-charge adjustment device to adjust the states of charge of one or both of the cell having the maximum value and the cell having the minimum value to the state-of-charge adjustment values.

5 Claims, 8 Drawing Sheets

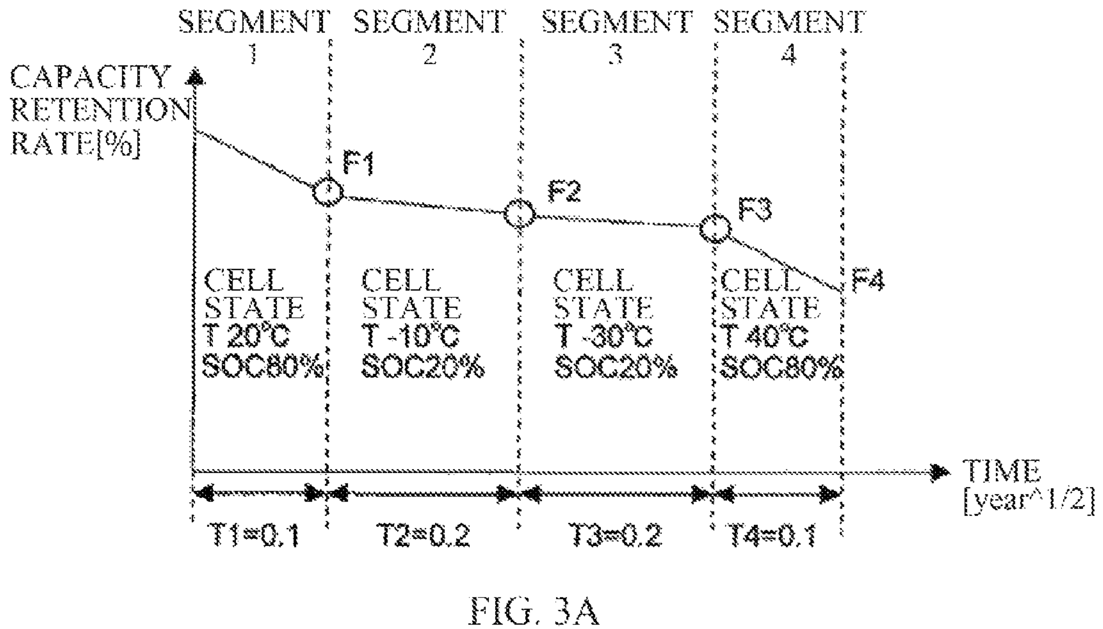

FIG. 3A

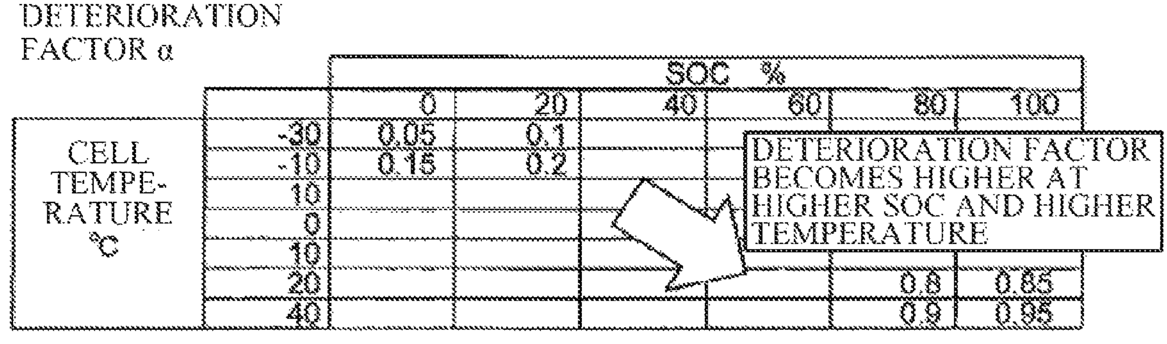

DETERIORATION FACTOR α

| | | SOC % | | | | | |
|---|---|---|---|---|---|---|---|
| | | 0 | 20 | 40 | 60 | 80 | 100 |
| CELL TEMPE-RATURE °C | -30 | 0.05 | 0.1 | | | | |
| | -10 | 0.15 | 0.2 | | | | |
| | 10 | | | | | | |
| | 0 | | | | | | |
| | 10 | | | | | | |
| | 20 | | | | | 0.8 | 0.85 |
| | 40 | | | | | 0.9 | 0.95 |

DETERIORATION FACTOR BECOMES HIGHER AT HIGHER SOC AND HIGHER TEMPERATURE

FIG. 3B

| | CELL TEMPE-RATURE [°C] | SOC [%] | DETERIO-RATION FACTOR [-] | NEG-LECT TIME [year^1/2] | CAPACITY RETENTION RATE: CALCU-LATION EXPRESSION OF CAPACITY RETENTION RATE | CAPACITY RETENTION RATE: CALCU-LATION RESULT OF CAPACITY RETENTION RATE |
|---|---|---|---|---|---|---|
| SEGMENT 1 | 20 | 80 | α1=0.8 | T1=0.1 | F1=1-α1×T1 | 0.92 |
| SEGMENT 2 | -10 | 20 | α2=0.2 | T2=0.2 | F2=F1-α2×T2 | 0.88 |
| SEGMENT 3 | -30 | 20 | α3=0.1 | T3=0.2 | F3=F2-α3×T3 | 0.86 |
| SEGMENT 4 | 40 | 80 | α4=0.9 | T4=0.1 | F4=F3-α4×T4 | 0.77 |

FIG. 3C

| | | CELL TEMPERATURE [°C] | | SOC[%] | |
|---|---|---|---|---|---|
| | | CELL A | CELL B | CELL A | CELL B |
| PAST | SEGMENT A | 20 | 30 | 80 | 80 |
| | SEGMENT B | −10 | 0 | 80 | 80 |
| FUTURE | SEGMENT C WITHOUT CELL BALANCING OF THE EMBODIMENT OF THE DISCLOSURE | −10 | 0 | 80 | 80 |
| | SEGMENT C WITH CELL BALANCING OF THE EMBODIMENT OF THE DISCLOSURE | | | | 75 |

| DETERIORATION FACTOR α | | NEGLECT TIME [year^1/2] | CAPACITY RETENTION RATE | | |
|---|---|---|---|---|---|
| CELL A | CELL B | | CELL A | CELL B | CAPACITY DEVIATION |
| 0. 7 | 0. 75 | 0. 1 | 0. 93 | 0. 925 | 0. 005 |
| 0. 55 | 0. 6 | 0. 2 | 0. 82 | 0. 805 | 0. 015 |
| 0. 55 | 0. 6 | 0. 2 | 0. 71 | 0. 685 | 0. 025 |
| | 0. 575 | | | 0. 69 | 0. 02 |

| | | SOC[%] | | | | | |
|---|---|---|---|---|---|---|---|
| | | 0 | 20 | 40 | 60 | 80 | 100 |
| CELL TEMPE-RATURE [°C] | -30 | 0.05 | 0.15 | 0.25 | 0.35 | 0.45 | 0.55 |
| | -20 | 0.1 | 0.2 | 0.3 | 0.4 | 0.5 | 0.6 |
| | -10 | 0.15 | 0.25 | 0.35 | 0.45 | 0.55 | 0.65 |
| | 0 | 0.2 | 0.3 | 0.4 | 0.5 | 0.6 | 0.7 |
| | 10 | 0.25 | 0.35 | 0.45 | 0.55 | 0.65 | 0.75 |
| | 20 | 0.3 | 0.4 | 0.5 | 0.6 | 0.7 | 0.8 |
| | 30 | 0.35 | 0.45 | 0.55 | 0.65 | 0.75 | 0.85 |
| | 40 | 0.4 | 0.5 | 0.6 | 0.7 | 0.8 | 0.9 |
| | 50 | 0.45 | 0.55 | 0.65 | 0.75 | 0.85 | 0.95 |
| | 60 | 0.5 | 0.6 | 0.7 | 0.8 | 0.9 | 1 |

SOC WITH DETERIORATION FACTOR OF 0.575 IS 0.75 OR 75% BY LINEAR COMPLEMENT

FIG. 6

CELL BALANCING METHOD AND CELL BALANCING SYSTEM

CROSS-REFERENCE TO RELATED APPLICATIONS

The present application claims priority from Japanese Patent Application No. 2022-119849 filed on Jul. 27, 2022, the entire contents of which are hereby incorporated by reference.

BACKGROUND

The disclosure relates to a cell balancing method and a cell balancing system. In particular, the disclosure relates to a cell balancing method and a cell balancing system that adjust states of charge of cells of a lithium-ion battery that constitute a battery pack mounted on an electric vehicle.

Lithium-ion batteries are mounted on electric vehicles and serve as motive power sources for electric vehicles. Lithium-ion batteries deteriorate in characteristics depending on environment in which they are used. For example, a lithium-ion battery initially maintains its battery capacity, but deterioration progresses as the lithium-ion battery is left at a high temperature, resulting in a decline in the battery capacity with the passage of time. Moreover, deterioration progresses as the lithium-ion battery is left at a high state of charge (SOC), resulting in the decline in the battery capacity with the passage of time. As described, lithium-ion batteries have a tendency to have deterioration accelerated with the passage of time at high temperatures and a high SOC.

Such a concern about deterioration also arises in each cell of the lithium-ion battery constituting a battery pack. A degree of deterioration varies depending on, for example, a position at which each cell is arranged. Such variations in the deterioration adversely affects the workings of the lithium-ion battery.

In Japanese Unexamined Patent Application Publication (JP-A) No. 2015-37011, during stoppage of an electric vehicle, when a state in which a battery is at a high temperature and a high SOC is detected the predetermined number of times within a predetermined period of time, an auxiliary device of the electric vehicle is brought into operation to discharge the battery and lower the SOC. This prevents the battery from being exposed to a high temperature at a high SOC, leading to suppression of deterioration of the battery.

SUMMARY

An aspect of the disclosure provides a cell balancing method to be applied to an electric vehicle including a lithium-ion battery. The lithium-ion battery serves as a motive power source of the electric vehicle and includes cells. The cell balancing method includes adjusting a state of charge of each of the cells of the lithium-ion battery. The cell balancing method includes: setting predicted standing time by predicting standing time from a stop of the electric vehicle to a next start-up of the electric vehicle, based on a statistic value of the standing time collected over a predetermined period of time; estimating a capacity retention rate of each of the cells of the lithium-ion battery at the next start-up after a lapse of the predicted standing time, based on a measured temperature or an estimated temperature, the state of charge, and a deterioration factor of each of the cells during stoppage of the electric vehicle; on the condition that a difference in the estimated capacity retention rate between a maximum value and a minimum value becomes greater than a predetermined value, setting a state-of-charge adjustment value for keeping the difference in the capacity retention rate between the maximum value and the minimum value within the predetermined value, for one or each of a cell, among the cells, having the maximum value and a cell, among the cells, having the minimum value; and allowing, during the stoppage of the electric vehicle, a state-of-charge adjustment device that is configured to adjust the states of charge of the cells by raising or lowering the states of charge of one or more of the cells to adjust the state of charge of one or each of the cell having the maximum value and the cell having the minimum value to the state-of-charge adjustment value.

An aspect of the disclosure provides a cell balancing system to be applied to an electric vehicle including a lithium-ion battery. The lithium-ion battery serves as a motive power source of the electric vehicle and includes cells. The cell balancing system includes a temperature determination device, a state-of-charge determination device, a state-of-charge adjustment device, and one or more processors. The temperature determination device is configured to measure or estimate a temperature of each of the cells of the lithium-ion battery. The state-of-charge determination device is configured to measure or estimate a state of charge of each of the cells. The state-of-charge adjustment device is configured to adjust the state of charge of each of the cells by raising or lowering the state of charge of at least one of the cells. The one or more processors are configured to transmit and receive data to and from the temperature determination device, the state-of-charge determination device, and the state-of-charge adjustment device. The one or more processors configured to function as a predicted standing time setting unit, a capacity retention rate estimation unit, and a state-of-charge adjustment value setting unit. The predicted standing time setting unit is configured to set predicted standing time by predicting standing time from a stop of the electric vehicle to a next start-up of the electric vehicle, based on a statistic value of the standing time collected over a predetermined period of time. The capacity retention rate estimation unit is configured to estimate a capacity retention rate of each of the cells of the lithium-ion battery at the next start-up after a lapse of the predicted standing time, based on the temperature or an estimated temperature, the state of charge, and a deterioration factor of each of the cells during stoppage of the electric vehicle. The temperature and the estimated temperature are measured or estimated by the temperature determination device, and the state of charge is measured or estimated by the state-of-charge determination device. The state-of-charge adjustment value setting unit is configured to, on the condition that a difference in the estimated capacity retention rate between a maximum value and a minimum value becomes greater than a predetermined value, set a state-of-charge adjustment value for one or each of a cell, among the cells, having the maximum value and a cell, among the cells, having the minimum value. The state-of-charge adjustment value is provided for keeping the difference in the capacity retention rate between the maximum value and the minimum value within the predetermined value. The one or more processors are configured to allow, during the stoppage of the electric vehicle, the state-of-charge adjustment device to adjust the states of charge of one or each of the cell having the maximum value and the cell having the minimum value to the state-of-charge adjustment value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 3A, 3B, and 3C describe a calculation method of a capacity retention rate.

FIG. 6 describes deterioration factors to be used in the calculation of the capacity retention rate.

DETAILED DESCRIPTION

Figure 1:
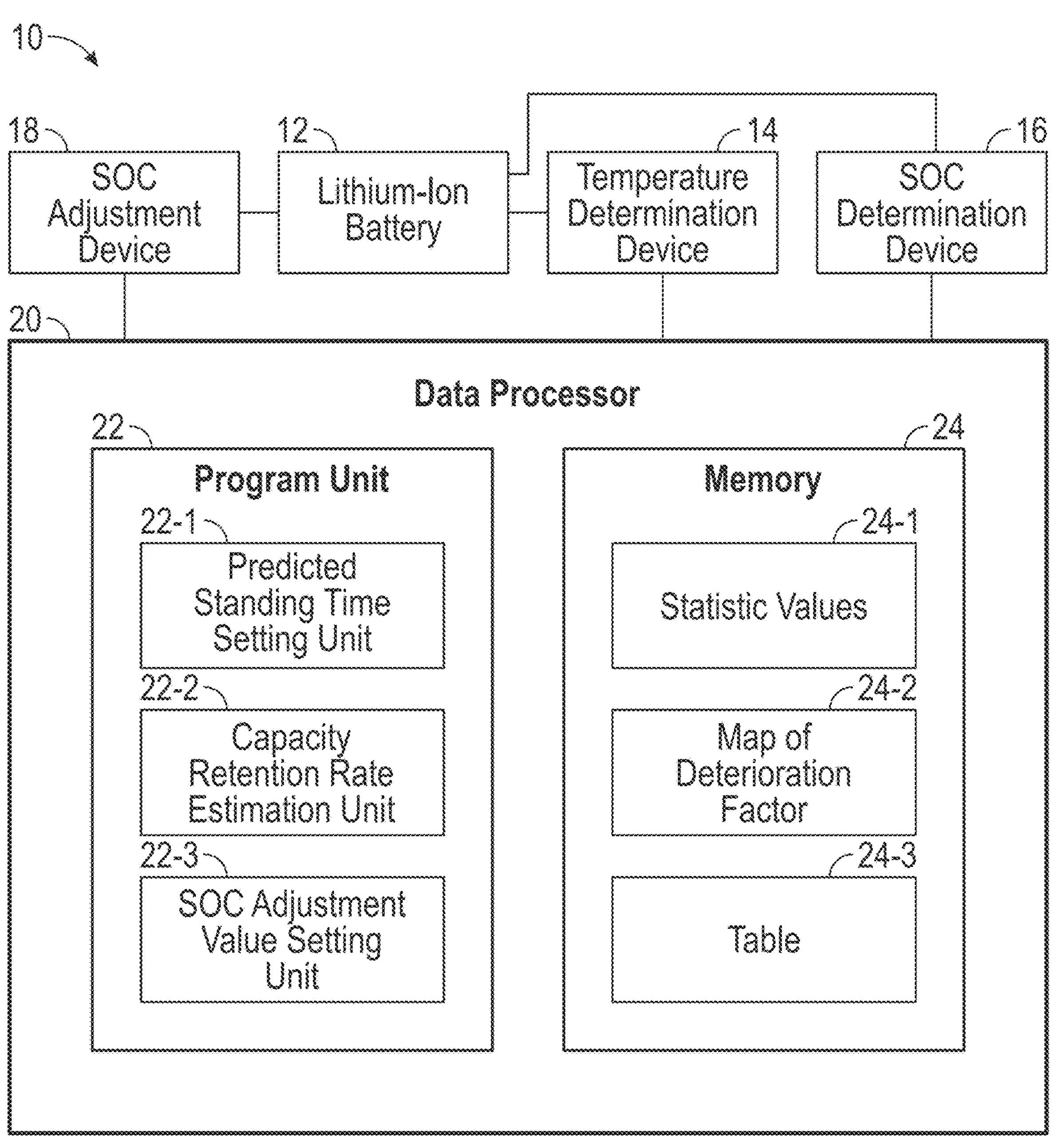
FIG. 1 is a schematic configuration diagram of a cell balancing system according to an embodiment of the disclosure.

In the method described in JP-A No. 2015-37011, the operation to suppress the deterioration is carried out solely when the battery is at a high-temperature and a high SOC at which the deterioration is accelerated. However, because the operation is carried out uniformly for the entire battery, it is difficult to control each individual cell constituting the battery to suppress the progress of the deterioration. As described, the cells constituting the battery are not all in the same state of deterioration. Because the cells differ in, for example, the capacity, the SOC, a capacity retention rate, and a deterioration factor, the cells each have different states of progress of the deterioration. The "capacity retention rate" indicates a rate at which the SOC decreases with the passage of time. The "deterioration factor" indicates a degree of the progress of the deterioration related to the capacity retention rate. In particular, when variations in the capacity retention rate between the cells are large, deterioration in characteristics is remarkable when viewed as a battery as a whole. For example, it is known that various matters caused by, for example, rapid discharge from a cell having a low capacity retention rate have adverse effects on the entire battery.

It is desirable to provide a cell balancing method and a cell balancing system that make it possible to appropriately suppress progress of deterioration for each cell of a lithium-ion battery constituting a battery pack to be mounted on an electric vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

As described below in detail, the example embodiments of the disclosure include adjusting, during stoppage of an electric vehicle until a next start-up, SOCs of cells of a lithium-ion battery constituting a battery pack, to control variations in a capacity retention rate between the cells within a predetermined value at the next start-up.

FIG. 1 is a schematic configuration diagram, or a block diagram, of a cell balancing system according to an embodiment of the disclosure. A cell balancing system 10 according to the embodiment may include, for example, a temperature determination device 14, an SOC determination device 16, an SOC adjustment device 18, and a data processor 20. The temperature determination device 14 may measure or estimate a temperature of each cell of a lithium-ion battery 12. The SOC determination device 16 may measure or estimate an SOC of each cell. The SOC adjustment device 18 may adjust the SOC of each cell by raising or lowering the SOCs of one or more cells. The data processor 20 may transmit and receive data to and from the temperature determination device 14, the SOC determination device 16, and the SOC adjustment device 18.

The data processor 20 may include, for example, an unillustrated central processing unit (CPU), a program unit 22, and a memory 24. The program unit 22 may include, for example, a predicted standing time setting unit 22-1, a capacity retention rate estimation unit 22-2, and an SOC adjustment value setting unit 22-3. The predicted standing time setting unit 22-1 may predict standing time from a stop of the electric vehicle to a next start-up of the electric vehicle, based on statistic values of the standing time collected over a predetermined period of time. The capacity retention rate estimation unit 22-2 may calculate and estimate a capacity retention rate of each cell of the lithium-ion battery at the next start-up after a lapse of the predicted standing time, based on a temperature or an estimated temperature, the SOC, and a deterioration factor of each cell during the stoppage of the electric vehicle. The temperature or the estimated temperature are obtained by the temperature determination device 14. The SOC is obtained by the SOC determination device 16. The SOC adjustment value setting unit 22-3 may set, when a difference in the estimated capacity retention rate between a maximum value and a minimum value is greater than a predetermined value, SOC adjustment values for one or both of a cell having the maximum value and a cell having the minimum value. The SOC adjustment values are provided for keeping the difference in the capacity retention rate between the maximum value and the minimum value within the predetermined value. In one embodiment of the disclosure, the data processor 20 may serve as "one or more processors".

The memory 24 may hold data such as statistic values 24-1 of the standing time for each day of the week of the electric vehicle, a map of the deterioration factor 24-2 for each cell, and a table 24-3 of relation between the temperature and the SOC of each cell. The statistic value 24-1 is to be used in setting the predicted standing time. The map of the deterioration factor 24-2 is to be used in estimating the capacity retention rate.

As mentioned above, the example embodiments of the disclosure include adjusting, during the stoppage of the electric vehicle until the next start-up, the SOCs of the cells of the lithium-ion battery constituting the battery pack, to control the variations in the capacity retention rate between the cells within the predetermined value at the next start-up.

Processes of the cell balancing method described below may be carried out by the predicted standing time setting unit 22-1, the capacity retention rate estimation unit 22-2, and the SOC adjustment value setting unit 22-3 in the program unit 22 of the data processor 20 illustrated in FIG. 1. The adjustment of the SOCs of the cells by raising or lowering the SOCs of one or more cells may be made by the SOC adjustment device 18.

Figure 2A:
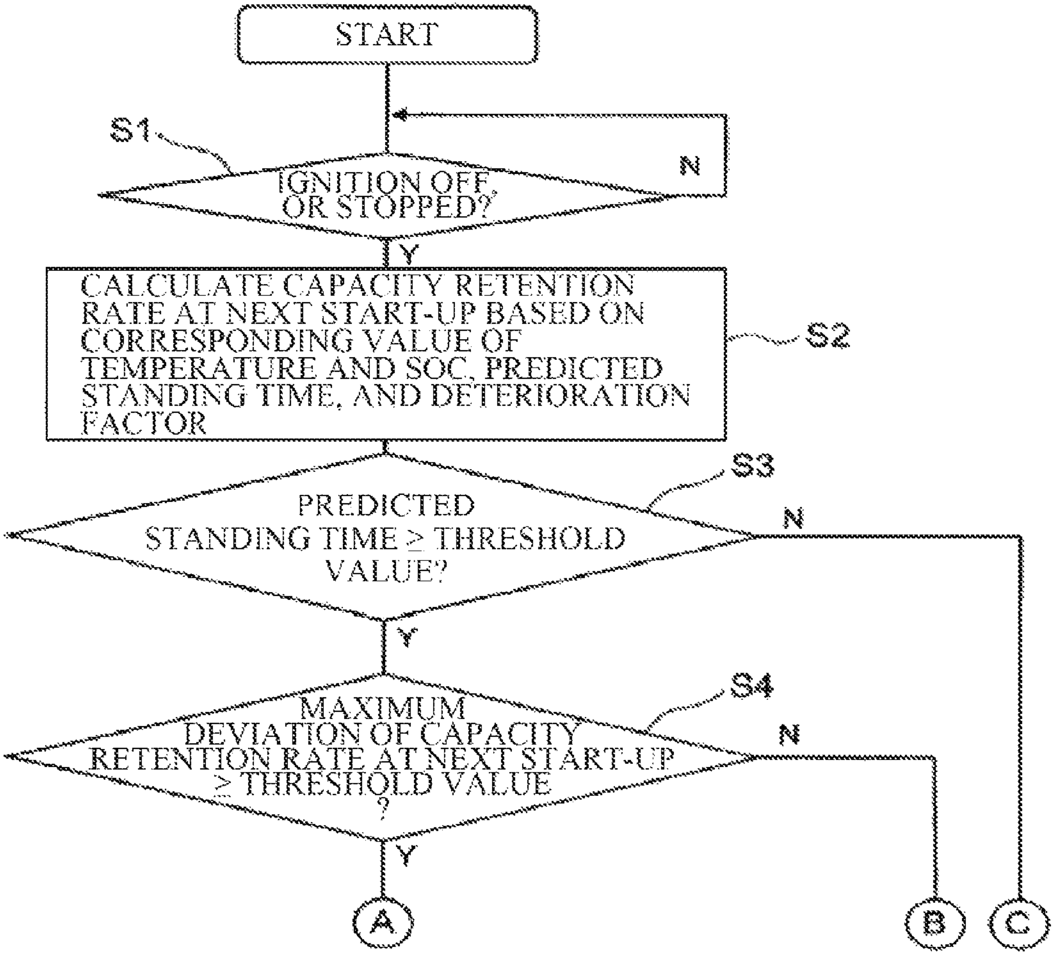
FIG. 2A is a flowchart of a first half of a cell balancing method according to the embodiment of the disclosure.
Figure 2B:
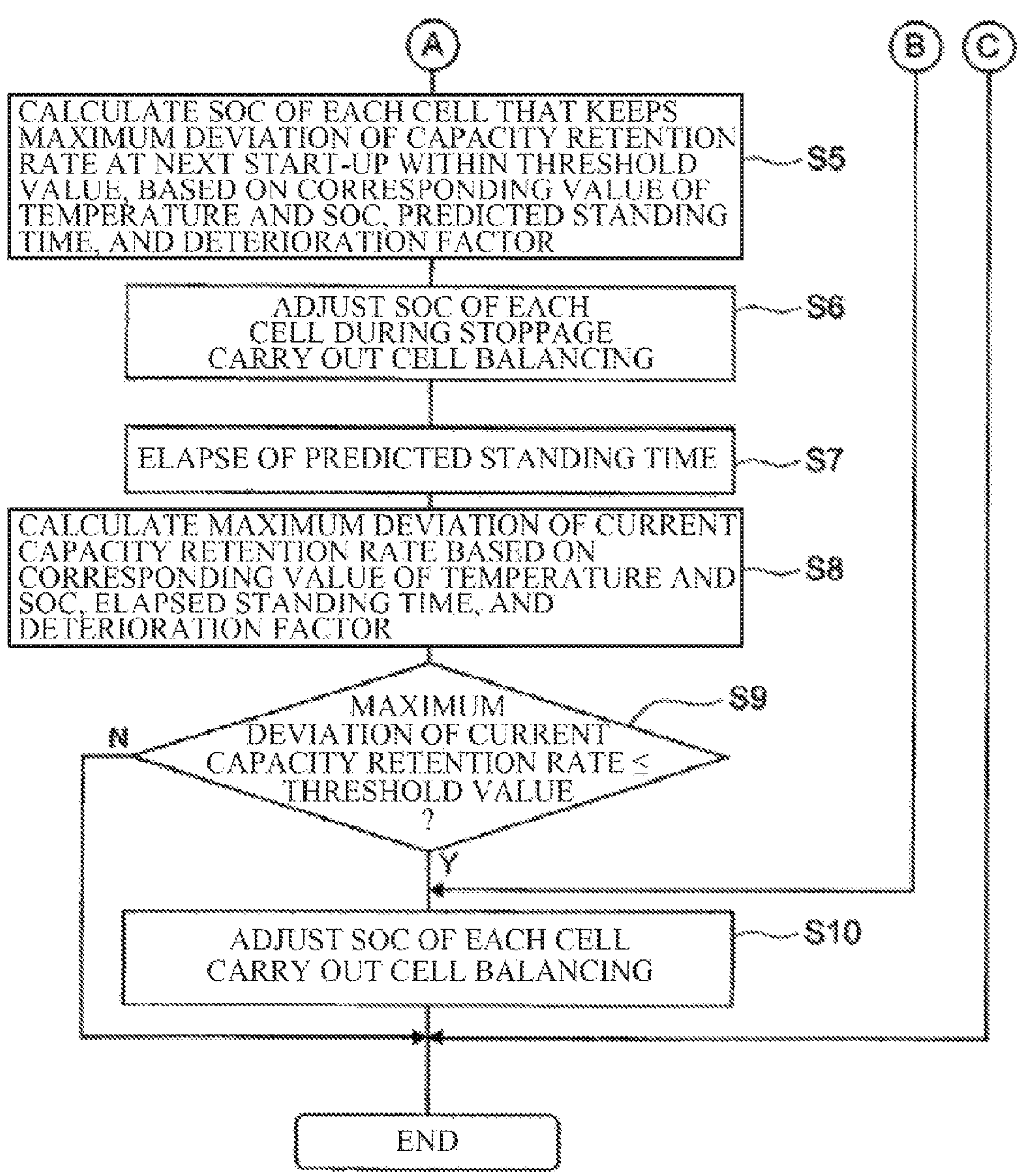
FIG. 2B is a flowchart of a second half of the cell balancing method according to the embodiment of the disclosure.

FIGS. 2A and 2B illustrate a flowchart of the cell balancing method. First, the data processor 20 may determine whether or not the electric vehicle is stopped (step S1). When the electric vehicle is not stopped (N in step S1), the data processor 20 may be on standby until the electric vehicle is stopped. When the data processor 20 confirms that the electric vehicle is stopped (Y in step S1), the data processor 20 may calculate the capacity retention rate at the next start-up based on a corresponding value between the measured temperature or the estimated temperature and the SOC of each cell during the stoppage, the predicted standing time, and the deterioration factor (step S2). In one embodiment of the disclosure, the process of step S2 may serve as "setting predicted standing time" and "estimating a capacity retention rate".

In estimating the capacity retention rate, the capacity retention rate may be calculated based on: the corresponding value of the measured temperature or the estimated temperature and the SOC of each cell during the stoppage; the predicted standing time T [year^½] predicted in setting the predicted standing time; and the deterioration factor α corresponding to the measured temperature or the estimated temperature and the SOC of each cell during the stoppage, by an expression $$F=F_{initial}\alpha\cdot T$$

in which $F_{initial}$ is the capacity retention rate during the stoppage. This makes it possible to appropriately obtain the capacity retention rate with high reliability in estimating the capacity retention rate. The capacity retention rate indicates a state of deterioration of each cell. Here, the temperature of each cell may be an actual measured value, or alternatively, the temperature of each cell may be an estimated temperature estimated based on an actual measured value of a temperature of an adjacent battery cell.

The corresponding value of the measured temperature or the estimated temperature and the SOC during the stoppage may be obtained by associating the temperature of each cell with the SOC at the relevant temperature. For example, the corresponding value may be summarized in a table by measuring the temperature of each cell of the lithium-ion battery and the SOC at the relevant temperature over a predetermined period of time. In one example, let us assume that the following data regarding a cell A is obtained: the most frequent measured value of the SOC at a temperature is 40%; the next frequent measured value is 60%; and the third frequent measured value is 20%. In this case, for the cell A, the SOC at the temperature 20° C. may be associated with 40%. Similar association may be made for all the cells. These pieces of data may be held in the table 24-3 of the relation between the temperature and the SOC of each cell in the memory 24 of the data processor 20.

As for the predicted standing time in setting the predicted standing time, for example, each day of the week and actual measured values of the standing time on the relevant day of the week may be aggregated over a predetermined period of time. Each day of the week and a typical value on the relevant day of the week may be summarized in a table. Thus, the standing time on the predetermined day of the week may be predicted. For example, the standing time on Monday may be predicted to be 8 hours, and the standing time on Sunday may be predicted to be 9 hours. This makes it possible for the predicted standing time predicted in setting the predicted standing time to reflect a tendency of each day of the week. Hence, it is possible to obtain the more accurate standing time. It is also possible to estimate the capacity retention rate of each cell with high reliability in estimating the capacity retention rate.

The deterioration factor may be obtained by actual measurement based on the temperature and the SOC of each cell. It is possible to immediately obtain the deterioration factor when the measured temperature or the estimated temperature and the SOC of the relevant cell are known. The higher the SOC and the higher the temperature, the greater the deterioration factor. For example, when the temperature is −30° C. and the SOC is 20%, the deterioration factor obtained is 0.1. When the temperature is 40° C. and the SOC is 90%, the deterioration factor obtained is 0.9. The data related to the deterioration factor may be held in the map of the deterioration factor 24-2 in the memory 24 of the data processor 20.

The calculation method of the capacity retention rate in step S2 is described with reference to FIGS. 3A to 3C. FIGS. 3A to 3C illustrate how the capacity retention rate is obtained over four segments when cell states differ from segment to segment. The cell states include the measured temperature or the estimated temperature and the SOC. FIG. 3A illustrates relation between the capacity retention rate and time for a certain cell in the four segments. Let us assume that time is divided into the segments 1 to 4, and that in the segment 1, the measured temperature or the estimated temperature is 20° C. and the corresponding SOC is 80%. In this case, the deterioration factor al is obtained as 0.8 from the table in FIG. 3B. Next, in the segment 1, the standing time or neglect time T1 [year^½] is 0.1, and therefore, the capacity retention rate is calculated as 0.92 by the calculation expression of the capacity retention rate: $F1=F_{initial}-\alpha1\cdot T1$. Here, $F_{initial}$ is 1.

Similar calculation may be made for the segments 2 to 4, to obtain the capacity retention rates as illustrated in, for example, FIG. 3C. That is, for the segment 2, the capacity retention rate is obtained as 0.88. For the segment 3, the capacity retention rate is obtained as 0.86. For the segment 4, the capacity retention rate is obtained as 0.77.

Figure 4:
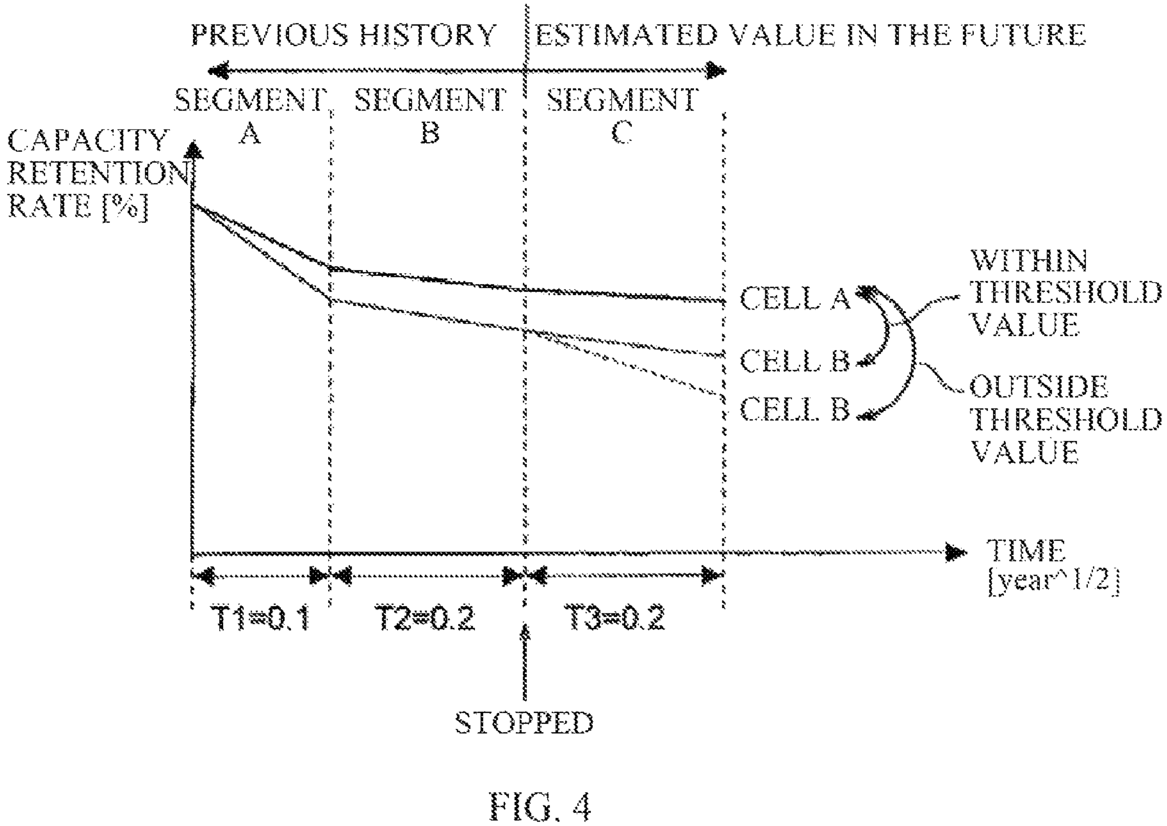
FIG. 4 describes the calculation method of the capacity retention rate.

Next, with reference to FIG. 4, description is given as to how to keep a difference in the capacity retention rate between a maximum value and a minimum value at the next start-up within a threshold value in this embodiment, when it is estimated that the difference is greater than the threshold value. The description is given of the following case where: the battery pack includes a large number of the cells of the lithium-ion battery; a battery cell having the maximum capacity retention rate is called a cell A; a battery cell having the minimum capacity retention rate is called a cell B; and the difference in the capacity retention rate between the cells A and B is kept within the threshold value of 0.02. The threshold value of 0.02 is given as an example.

Figure 5:
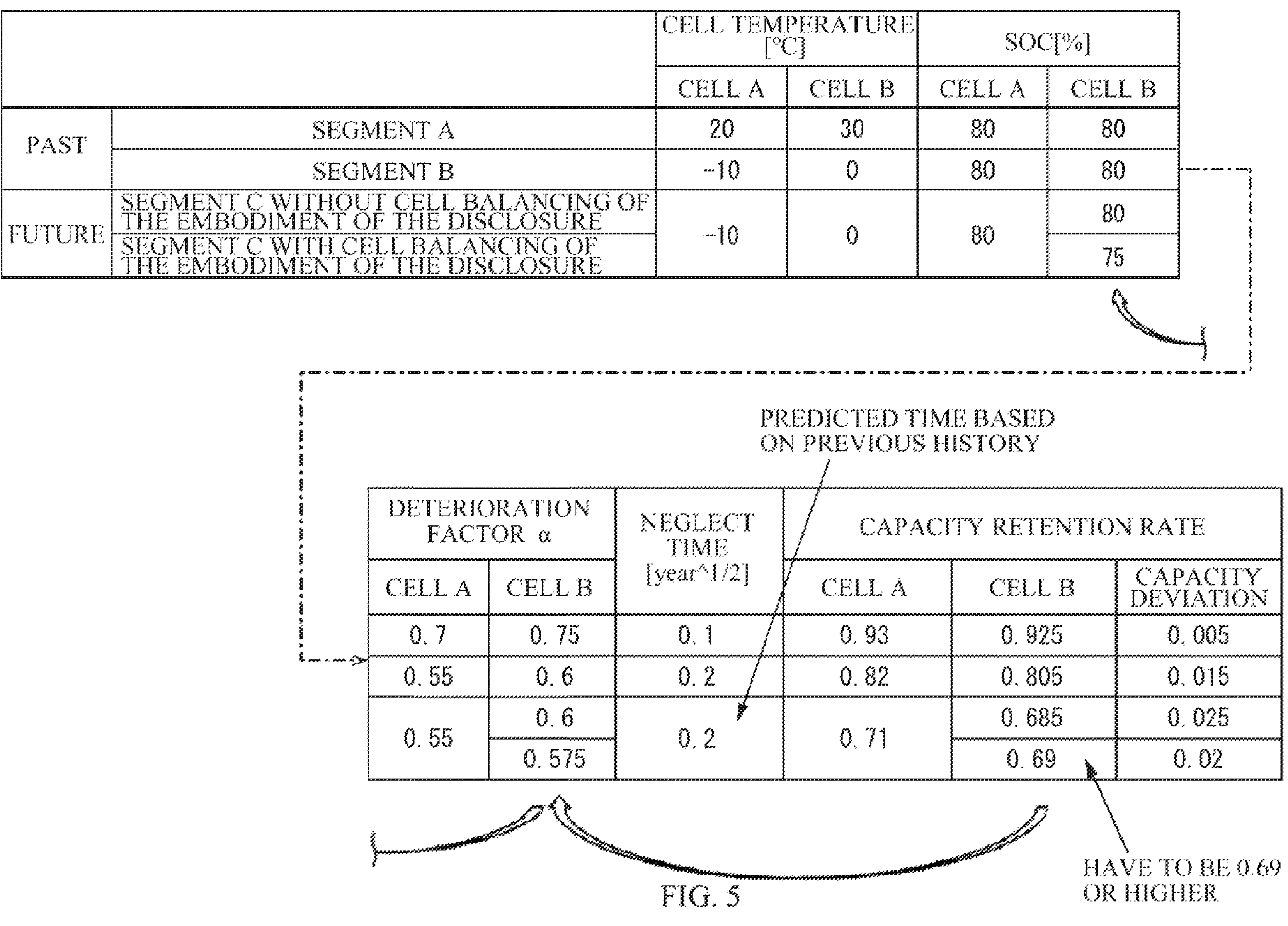
FIG. 5 describes the calculation method of the capacity retention rate.

First, for the cells A and B, the capacity retention rates during the stoppage may be obtained. FIG. 5 summarizes the temperature, i.e., the measured temperature or the estimated temperature, the SOC, and the neglect time, i.e., the standing time, of each of the cells A and B in each of the segments. Based on the table in FIG. 5, the battery cell A is at the temperature of 20° C. and the SOC of 80% in a segment A. From the map of the deterioration factor in FIG. 6, the deterioration factor is determined to be 0.7. By the calculation expression of the capacity retention rate, the capacity retention rate is determined to be 0.93 at an end point of the segment A. Similarly, at an end point of the segment B, or when stopped, the capacity retention rate is determined to be 0.82.

Similarly, the capacity retention rate for the battery cell B may be determined to be 0.925 at the end point of the segment A, and 0.805 at the end point of the segment B, or when stopped.

Next, the capacity retention rate at the next start-up may be obtained. By the calculation expression of the capacity retention rate as mentioned above, the capacity retention rate of the battery cell A is determined to be 0.71, and the capacity retention rate of the battery cell B is determined to be 0.685. These are the capacity retention rates estimated for the cells A and B at the next start-up, and the difference in the capacity retention rate is 0.025. When the threshold value is set to, for example, 0.02, the difference is greater than the threshold value.

Referring back to the flowcharts, in step S3, the data processor 20 may determine whether or not the predicted standing time is equal to or longer than a threshold value. The threshold value may be, for example, 8 hours. When the predicted standing time is not equal to or longer than the threshold value (N in step S3), the data processor 20 may end the control. When the predicted standing time is equal to or longer than the threshold value (Y in step S3), the data processor 20 may determine whether or not a maximum deviation of the capacity retention rate at the next start-up is equal to or greater than the threshold value (step S4). The maximum deviation of the capacity retention rate means the difference in the capacity retention rate between the maximum value and the minimum value.

Figure 7A:
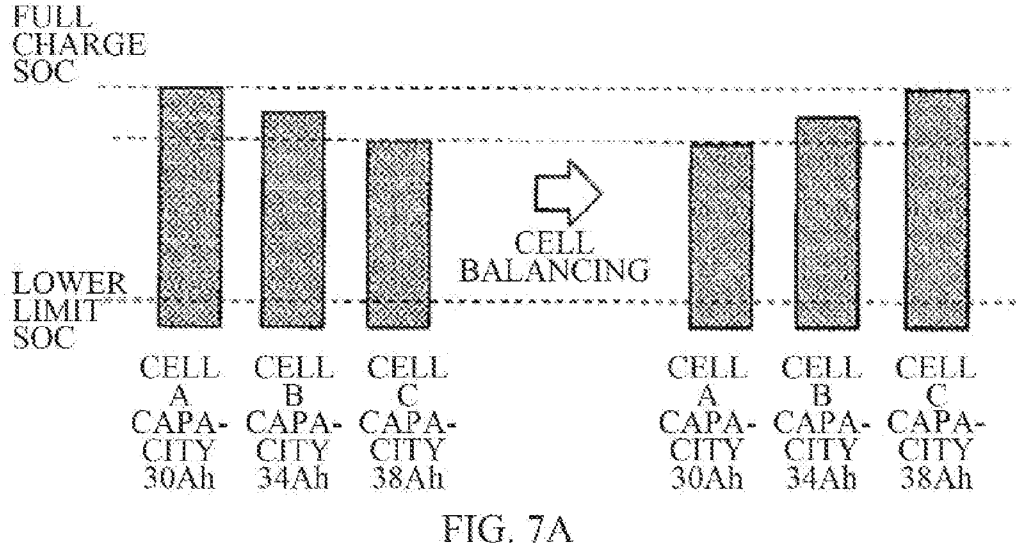
FIGS. 7A and 7B are schematic diagrams illustrating cell balancing between cells.
Figure 7B:
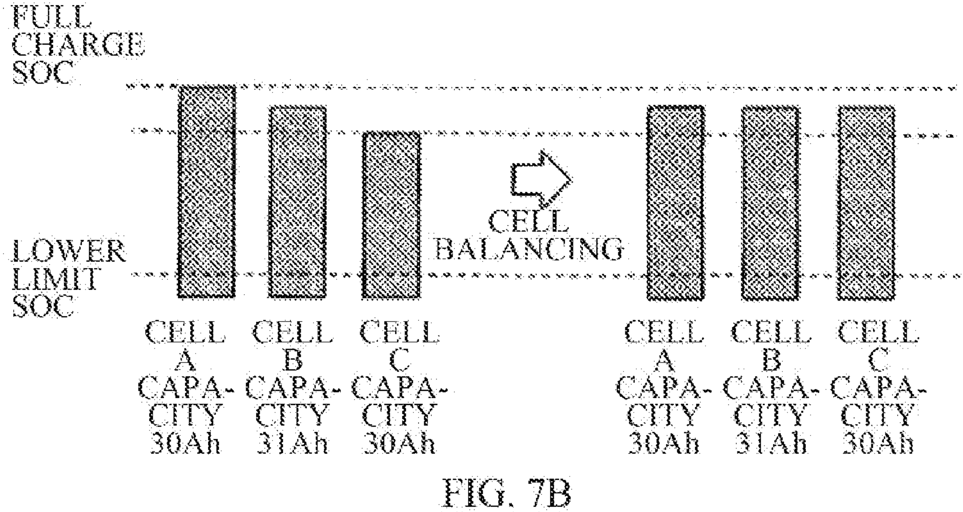

When the maximum deviation is not equal to or greater than the threshold value (N in step S4), adjustment of the SOC of each cell in step S10 may be made. The adjustment of the SOC as used here, i.e., so-called cell balancing, is a control of leveling the SOC of all the cells as illustrated in FIG. 7B. In one embodiment of the disclosure, the process in step S4 may serve as "adjusting states of charge".

In a general cell balancing device of a passive method for cell balancing, a resistor is coupled in parallel with each battery cell with a switch in between. Turning on the switch allows the resistor to convert energy of the battery cell into heat, to lower the SOC of the battery cell. It is needless to say that the cell balancing may be performed by an active cell balancing method.

In step S4, when the maximum deviation of the estimated capacity retention rate at the next start-up is equal to or greater than the threshold value (Y in step S4), the data processor 20 may calculate, in step S5, the SOC of each cell that keeps the maximum deviation of the capacity retention rate within the threshold value at the next start-up, based on the corresponding value of the temperature and the SOC, the predicted standing time, and the deterioration factor. In one embodiment of the disclosure, the process in step S5 may serve as "setting the state-of-charge adjustment values".

Referring back to FIGS. 3A to 3C and FIG. 4, description is given of the calculation method of the SOC adjustment value in setting the SOC adjustment values. As described above, the estimated capacity retention rate at the next start-up is 0.71 for the battery cell A and 0.685 for the battery cell B. Thus, the deviation is greater than the threshold value of 0.02. In the following, a target SOC for the battery cell B is described that brings the deviation to 0.02. In one embodiment of the disclosure, the target SOC may serve as a "state-of-charge adjustment value".

Because the estimated capacity retention rate at the next start-up is 0.71 for the battery cell A, the estimated capacity retention rate of the battery cell B has to be 0.69. By the calculation expression of the capacity retention rate, the deterioration factor of the battery cell B for this purpose is determined to be 0.575. From the map of the deterioration factor in FIG. 6, the SOC adjustment value to bring the degradation factor to 0.575 is obtained as 0.75 or 75% by linear complement of a row of the battery temperature of 0° C.

After setting the target SOC for the cell B, i.e., the SOC adjustment value for the cell B, the SOC of the cell B may be adjusted for the cell balancing during the stoppage of the electric vehicle, to bring the SOC of the cell B to the SOC adjustment value thus set. In one embodiment of the disclosure, this process may serve as "adjusting the states of charge". In this cell balancing, as illustrated in FIG. 7A, the SOC of each cell is individually adjusted to the target SOC for the relevant cell. It is to be noted that numerical values in the figure are merely examples. Generally, the cell balancing at this stage includes a control to lower the SOC of a cell having the high SOC and raise the SOC of a cell having the low SOC.

Thereafter, the data processor 20 may wait for an elapse of the predicted standing time (step S7). Thereafter, the data processor 20 may calculate the maximum deviation of the current capacity retention rate, i.e., the difference between the maximum value and the minimum value, based on the corresponding value of the temperature and the SOC, actual elapsed standing time, and the deterioration factor (step S8). When the numerical values used in the estimation, e.g., the temperature, the deterioration factor, and the predicted standing time, are the same as, for example, the actual temperature, the deterioration factor, and the elapsed standing time during the stoppage until the next start-up, the maximum deviation is kept within the threshold value.

Thereafter, the data processor 20 may determine whether or not the maximum deviation of the capacitance retention rate at the current time point, i.e., at the next start-up, is equal to or smaller than the threshold value (step S9). When the maximum deviation is not equal to or smaller than the threshold value (N in step S9), i.e., when the maximum deviation falls outside the threshold value, the data processor 20 may end the flow. When the maximum deviation is equal to or smaller than the threshold value (Y in step S9), i.e., when the maximum deviation is kept within the threshold value, the data processor 20 may adjust the SOCs of the cells in step 10 for the cell balancing. This cell balancing includes the control of leveling the SOCs of the cells as illustrated in FIG. 7B. In this way, it is possible to increase the capacity of the lithium-ion battery and to increase a travelable distance of the electric vehicle.

According to the cell balancing method and the cell balancing system of this embodiment, during the stoppage of the electric vehicle, the SOCs of the cells are adjusted to keep the maximum deviation at the next start-up within a predetermined range. The maximum deviation is the difference in the capacity retention rate between the maximum value and the minimum value. This leads to appropriate suppression of the progress of deterioration for each cell constituting the lithium-ion battery, making it possible to maintain the performance of the lithium-ion battery, and to allow for constant, comfortable use of the electric vehicle.

Although some example embodiments of the disclosure have been described in the foregoing by way of example with reference to the accompanying drawings, the disclosure is by no means limited to the embodiments described above.

It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in FIG. 4, the capacity retention rate during the stoppage is obtained with the use of previous history of two segments, i.e., the segments A and B. However, this is merely an example, and non-limiting. The threshold value of the difference in the capacity retention rate is set to 0.02, but this is merely an example, and other values may be adopted.

According to the cell balancing method of the example embodiments of the disclosure, in estimating the capacity retention rate, the capacity retention rate of each cell at the next start-up after the stop of the electric vehicle is estimated. On the condition that the difference in the capacity retention rate between the maximum value and the minimum value is greater than the predetermined value, i.e., the threshold value, the SOC adjustment values for one or both of the cell having the maximum value and the cell having the minimum value are set to keep the difference between the maximum value and the minimum value within the predetermined value at the next start-up. During the stoppage of the electric vehicle, the adjustment is made to bring the SOCs of one or both of the cell having the maximum value and the cell having the minimum value to the SOC adjustment values thus set. In one example, during the stoppage of the electric vehicle, the SOCs of the cells are adjusted to keep the difference in the capacity retention rate between the cells at the next start-up within the predetermined range. For example, the adjustment is made to raise the SOC of the cell having the minimum value of the capacity retention rate, to lower the SOC of the cell having the maximum value of the capacity retention rate, or both. This makes it possible to reduce the difference in the SOC between the cells, and to provide optimal balance in the performance of the cells in the entire battery. Hence, it is possible to keep optimal performance of the lithium-ion battery for long time.

Moreover, the predicted standing time predicted in setting the predicted standing time may reflect the tendency for each day of the week. This makes it possible to obtain the predicted standing time more accurately. Based on the accurate predicted standing time, it is possible to enhance reliability of the capacity retention rate of each cell to be calculated and estimated in estimating the capacity retention rate. This leads to effective cell balancing.

Furthermore, it is possible to appropriately obtain the capacity retention rate that indicates the state of deterioration of each cell to be estimated in estimating the capacity retention rate. Hence, it is possible to enhance the reliability of the capacity retention rate, leading to effective cell balancing.

According to the cell balancing system of the example embodiments of the disclosure, the one or more processors estimate the capacity retention rate of each cell at the next start-up after the stop of the electric vehicle. On the condition that the difference in the capacity retention rate between the maximum value and the minimum value is greater than the predetermined value, i.e., the threshold value, the one or more processors set the SOC adjustment values for one or both of the cell having the maximum value and the cell having the minimum value, to keep the difference between the maximum value and the minimum value within the predetermined value at the next start-up. During the stoppage of the electric vehicle, the one or more processors make the adjustment to bring the SOCs of one or both of the cell having the maximum value and the cell having the minimum value to the SOC adjustment values thus set. In one example, during the stoppage of the electric vehicle, the one or more processors adjust the SOC of the cells, to keep the difference in the capacity retention rates of the cells at the next start-up within the predetermined range. For example, the adjustment is made to raise the SOC of the cell having the minimum value of the capacity retention rate, to lower the SOC of the cell having the maximum value of the capacity retention rate, or both. This makes it possible to reduce the difference in the SOC between the cells, and to provide the optimal balance in the performance of the cells in the entire battery. Hence, it is possible to keep the optimal performance of the lithium-ion battery for long time.

According to the cell balancing method and the cell balancing system of the example embodiments of the disclosure, during the stoppage of the electric vehicle, the SOCs of the cells are adjusted to keep the difference in the capacity retention rates of the cells between the maximum value and the minimum value at the next start-up within the predetermined range. This makes it possible to appropriately suppress the progress of deterioration for each cell of the lithium-ion battery constituting the battery pack. Hence, it is possible to keep optimal performance of the battery pack for long time, leading to constant, comfortable use of the electric vehicle.

The data processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the data processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the data processor 20 illustrated in FIG. 1.

The invention claimed is:

1. A cell balancing method to be applied to an electric vehicle including a lithium-ion battery, the lithium-ion battery serving as a motive power source of the electric vehicle and including cells, the cell balancing method including adjusting a state of charge of each of the cells of the lithium-ion battery, and the cell balancing method comprising:

setting predicted standing time by predicting standing time from a stop of the electric vehicle to a next start-up of the electric vehicle, based on a statistic value of the standing time collected over a predetermined period of time;

estimating a capacity retention rate of each of the cells of the lithium-ion battery at the next start-up after a lapse of the predicted standing time, based on a measured temperature or an estimated temperature, the state of charge, and a deterioration factor of each of the cells during stoppage of the electric vehicle;

on a condition that a difference in the estimated capacity retention rate between a maximum value and a minimum value becomes greater than a predetermined value, setting a state-of-charge adjustment value for one or each of a cell, among the cells, having the maximum value and a cell, among the cells, having the minimum value, the state-of-charge adjustment value being provided for keeping the difference in the capacity retention rate between the maximum value and the minimum value within the predetermined value; and allowing, during the stoppage of the electric vehicle, a state-of-charge adjustment device to adjust the state of charge of one or each of the cell having the maximum value and the cell having the minimum value to the state-of-charge adjustment value, the state-of-charge adjustment device being configured to adjust the state of charge of each of the cells by raising or lowering the state of charge of at least one of the cells.

2. The cell balancing method according to claim 1, wherein in the setting the predicted standing time, the predicted standing time of the electric vehicle is predicted based on actual measured values of the standing time for each day of week collected in advance over the predetermined period of time.

3. The cell balancing method according to claim 1, wherein in the estimating the capacity retention rate, the capacity retention rate F of each of the cells is calculated based on:

the state of charge corresponding to a temperature of each of the cells during the stoppage of the electric vehicle;

the deterioration factor α corresponding to the temperature and the state of charge of each of the cells during the stoppage of the electric vehicle; and the predicted standing time T [year^½] predicted in the setting the predicted standing time, by an expression $$F=F_{initial}-\alpha\cdot T$$

in which $F_{initial}$ is the capacity retention rate during the stoppage of the electric vehicle.

4. The cell balancing method according to claim 2, wherein in the estimating the capacity retention rate, the capacity retention rate F of each of the cells is calculated based on:

the state of charge corresponding to a temperature of each of the cells during the stoppage of the electric vehicle;

the deterioration factor α corresponding to the temperature and the state of charge of each of the cells during the stoppage of the electric vehicle; and the predicted standing time T [year^½] predicted in the setting the predicted standing time, by an expression $$F=F_{initial}-\alpha\cdot T$$

in which $F_{initial}$ is the capacity retention rate during the stoppage of the electric vehicle.

5. A cell balancing system to be applied to an electric vehicle including a lithium-ion battery, the lithium-ion battery serving as a motive power source of the electric vehicle and including cells, the cell balancing system comprising:

a temperature determination device configured to measure or estimate a temperature of each of the cells of the lithium-ion battery;

a state-of-charge determination device configured to measure or estimate a state of charge of each of the cells;

a state-of-charge adjustment device configured to adjust the state of charge of each of the cells by raising or lowering the state of charge of at least one of the cells; and one or more processors configured to transmit and receive data to and from the temperature determination device, the state-of-charge determination device, and the state-of-charge adjustment device, the one or more processors configured to function as:

a predicted standing time setting unit configured to set predicted standing time by predicting standing time from a stop of the electric vehicle to a next start-up of the electric vehicle, based on a statistic value of the standing time collected over a predetermined period of time;

a capacity retention rate estimation unit configured to estimate a capacity retention rate of each of the cells of the lithium-ion battery at the next start-up after a lapse of the predicted standing time, based on the temperature or an estimated temperature, the state of charge, and a deterioration factor of each of the cells during stoppage of the electric vehicle, the temperature and the estimated temperature being measured or estimated by the temperature determination device, and the state of charge being measured or estimated by the state-of-charge determination device; and a state-of-charge adjustment value setting unit configured to, on a condition that a difference in the estimated capacity retention rate between a maximum value and a minimum value becomes greater than a predetermined value, set a state-of-charge adjustment value for one or each of a cell, among the cells, having the maximum value and a cell, among the cells, having the minimum value, the state-of-charge adjustment value being provided for keeping the difference in the capacity retention rate between the maximum value and the minimum value within the predetermined value, the one or more processors being configured to allow, during the stoppage of the electric vehicle, the state-of-charge adjustment device to adjust the state of charge of one or each of the cell having the maximum value and the cell having the minimum value to the state-of-charge adjustment value.

* * * * *